United States Patent Office 2,963,337
Patented Dec. 6, 1960

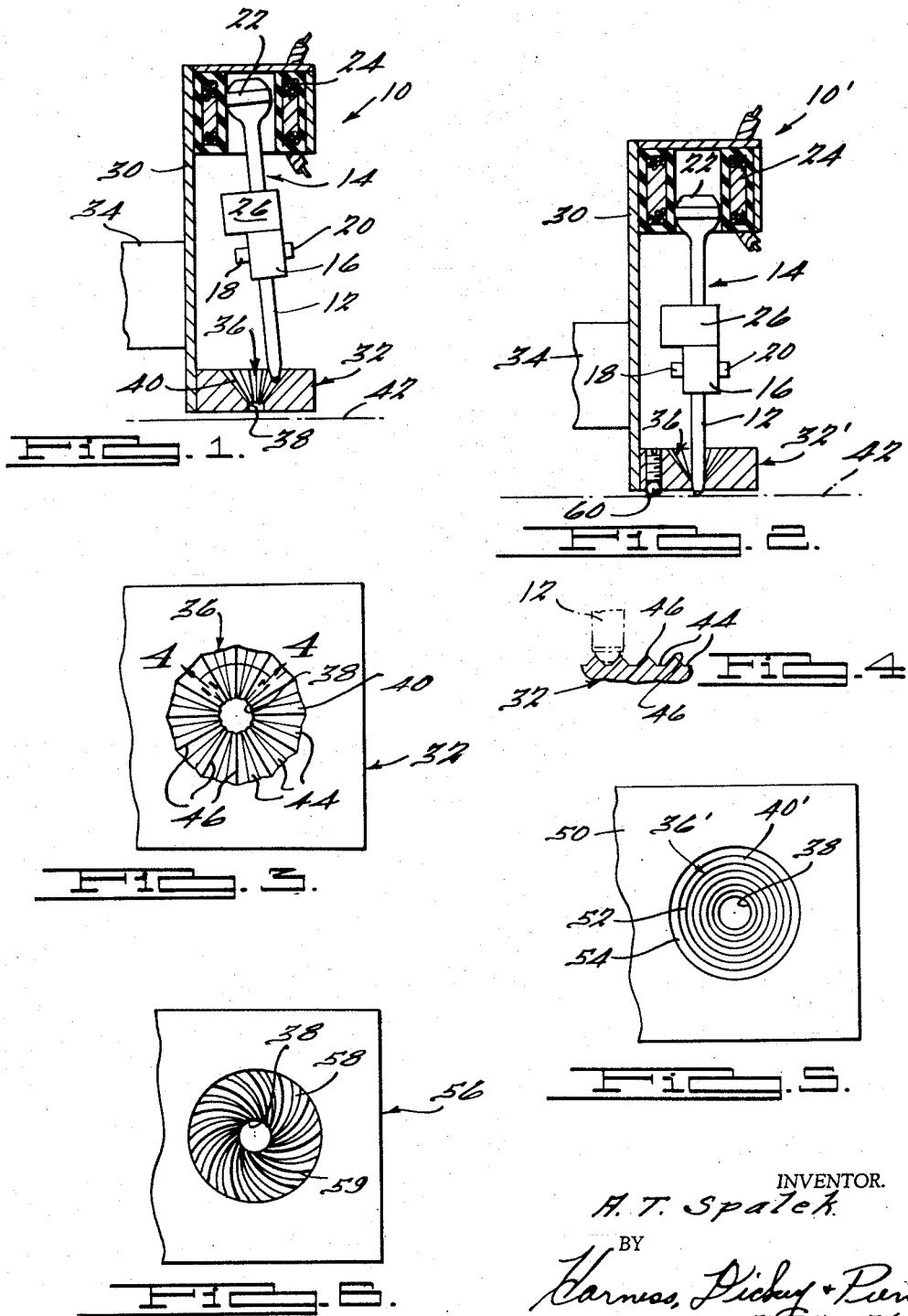

2,963,337

MARKING DEVICE

Adolph T. Spalek, 17128 Chandler Park Drive, Detroit 21, Mich.

Filed Aug. 11, 1958, Ser. No. 754,376

12 Claims. (Cl. 346—140)

This application is a continuation-in-part of my copending application Serial No. 711,406, filed January 27, 1958.

This invention relates to an improved marking device, and more particularly to an improved device for holding a writing instrument in a writing or marking apparatus.

The marking device of the present invention is especially well adapted for use in machines for making drawings such as, for example, the orthographic projection machine disclosed and claimed in my hereinabove referred to copending application, and in remotely controlled writing machines such as check and bond signing machines. A pencil is not a satisfactory marking instrument in such machines since it makes a nonpermanent mark, and where accurate marking is needed, it requires periodic sharpening at relatively short intervals. Also, pens using liquid ink are troublesome, since they tend to form splotches occasionally, and to be bothersome and generally messy to service.

Although a conventional ball point pen avoids the splotching and messiness of liquid ink pens, and does not require frequent attention, it has heretofore been considered impracticable for use in machines, since in order to make a mark, the ball has first to be rotated to expose a freshly inked surface. In general, a ball point pen is satisfactory for general writing, but after the pen has been idle for a time, the first portion of a stroke made with it does not make a visible mark, but serves merely to rotate the ball to bring a freshly inked surface thereof into contact with the writing paper. If, for example, a ball point pen is held above a surface and repeatedly dropped thereon, it will at best make dot impressions on the first few drops if the exposed surface of the ball happens to have been freshly coated with ink. But after making a few dots all of the ink is transferred from the exposed ball surface, and no further marks can be made until after the ball has again been rolled in its socket to expose a new, freshly ink-coated surface. Similarly, when used in a check signing machine, the leading portion of a signature is apt to be missed by the ball point and not to receive ink. The marking device of the present invention includes a conventional ball point pen cartridge mounted for vertical reciprocation toward and away from a surface to be marked, and means are provided for rolling the ball of the cartridge as it moves toward the surface. A freshly ink-coated portion of the ball surface is presented to the paper each time the pen contacts it.

Accordingly, one important object of the invention is to provide an improved marking device especially adaptable for use in remotely controlled marking or writing apparatus.

Further objects of the invention are: to provide an improved marking device including a conventional ball point type writing instrument and capable of depositing writing fluid upon a surface to be marked immediately upon contact therewith; to provide an improved holder for a ball point writing instrument including means for rotating the ball of the instrument just prior to the time it strikes the surface to be marked so that a freshly ink-coated portion of the ball will be exposed when the instrument is brought into contact with the surface; and in general to provide an improved marking device of simple, rugged, and inexpensive construction, and of general usefulness in all kinds of writing and marking machines.

These and other objects and advantages of the invention will become apparent in the following detailed description of representative embodiments thereof, taken in conjunction with the drawing, wherein:

Figure 1 is a cross-sectional view of a marking device according to a preferred embodiment of the invention, showing the ball point instrument in its fully retracted position;

Fig. 2 is a view generally similar to the view of Fig. 1, but showing a slightly modified form of the device, and showing the ball point instrument in its fully advanced position;

Fig. 3 is a plan view of the base portion of the marking device shown in Fig. 1;

Fig. 4 is a sectional view of the base portion, taken along the curved section line 4—4 of Fig. 3;

Fig. 5 is a plan view of a first modified form of the base portion of the marking device; and Fig. 6 is a plan view of a second modified form of the base portion of the marking device.

A marking device 10 according to a preferred embodiment of the invention is shown in Fig. 1, and includes a conventional ball point cartridge 12 removably fixed at the lower end of a solenoid plunger 14. In the arrangement shown, a bushing 16 is fitted over the bottom end of the plunger 14 and the upper end of the cartridge 12, and is secured to both of these members by separate setscrews 18 and 20, respectively, so that in effect the plunger 14 represents an extension of the cartridge 12. The plunger 14 is enlarged at its upper end, and formed into a generally truncated spherical portion 22, which is shaped so that when the plunger 14 is drawn upwardly into the solenoid 24 it can tilt, yet when the plunger is vertically disposed, as shown, for example, in Fig. 2, the ball portion 22 fits the solenoid relatively closely with very little side play.

A weight 26 is loosely mounted eccentrically on the plunger 14, resting upon the bushing 16, and urges the plunger 14 together with the cartridge 12 toward an inclined position. The weight 26 also provides a uniform impelling force for driving the plunger 14 and the cartridge 12 downwardly when the solenoid is de-energized.

The solenoid 24 is mounted upon a vertical plate 30, at the lower end of which a base member 32 is secured. The entire device 10 may be supported by any convenient means such as the illustrated bracket 34, which may be attached to the vertical plate 30 or to any other fixed portion of the device, as desired.

The base 32 has a central bore 36, the lower portion 38 of which is proportioned to fit the tip of the ball point instrument 12 relatively closely, and to hold it firmly in a predetermined alignment with respect to the base 32 when the solenoid is de-energized and the ball point cartridge 12 is driven downwardly into the bottom portion 38 of the bore. The upper portion 40 of the bore is outwardly flared so that the over-all shape of the bore 36 is that of a funnel. The spacing between the solenoid 24 and the base 32 relative to the over-all length of the plunger 14 and cartridge 12 is such that in operation the tip of the ball point cartridge 12 is never raised above the top of the base 32 and is always confined within the bore 36.

When the cartridge 12 is retracted, the eccentrically mounted weight 26 tilts it, causing it to pivot about a center defined by the rounded portion 22 of the plunger, and moving the tip of the cartridge 12 laterally into contact with the side wall of the upper portion 40 of the bore. The upper portion 40 of the bore is provided with a surface configuration, or texture for frictionally engaging the ball of the cartridge 12 and causing it to roll as it is driven downwardly along the upper portion 40, thereby to expose a freshly ink-coated portion of the ball at the moment it strikes the surface 42 to be marked. For this purpose, the surface of the upper portion 40 may be merely roughened, or scarified to provide a relatively rough surface texture, but for maximum efficiency and for positive rotation of the ball, the upper bore portion 40 is preferably shaped as illustrated in Figs. 1 to 4, having radially extending, alternate grooves 44 and ridges 46. This surface configuration of the tapered bore portion 40 provides a two-point frictional contact with the ball as the ball is droven downwardly therein, and produces a squeezing, pinching, or wedging action upon the ball for maximum rotational effect.

When the cartridge 12 is in its retracted position, the ball tip tends to fall into one of the grooves 44 under the gravitational urging of the weight 26. When thereafter the solenoid 24 is de-energized, the weight 26 drives the ball downwardly along the groove 44 in which it originally rested. The groove 44 narrows towards its lower end, driving the ball upwardly relative to the floor of the groove with a wedging action, so that the ball is frictionally gripped between two of the ridges 46, causing the ball to roll as it progresses from the top to the bottom of the groove 44. When it reaches the lower end of the groove 44, the ball falls into the lower portion 38 of the bore and continues directly downwardly to strike the surface to be marked in an accurately controlled location. With this arrangement, that is, with the alternate grooves 44 and ridges 46, the ball is gripped at two points on its surface as it travels along the upper bore portion 40, being wedgingly engaged, or pinched between two of the ridges 46. The surfaces of the ridges 46 may be slightly roughened if desired to maximize their frictional engagement of the ball.

Excellent results have also been achieved by use of alternative surface configurations such as those shown in Figs. 5 and 6, for example. The base 50 shown in Fig. 5 is exactly similar to the base 32 shown in Figs. 1–4 except that the upper portion 40' of its central bore is provided with a series of concentric annular grooves 52 and ridges 54 to provide a circularly corrugated effect. The base 56 shown in Fig. 6 provided with spiral grooves 58 and ridges 59, which, depending on their spiral curvature, act like the radial grooves 44 and ridges 46 or like the annular grooves 52 and ridge 54, and also cause the cartridge 12 to turn upon its long axis as it travels downwardly.

In general, any sort of roughening of the surface of the upper portion 40 of the bore will be sufficient to rotate the ball and thereby to expose a freshly ink-coated portion thereof at the time the ball strikes the surface 42 to be marked. The arrangement with the radial grooves 44 and ridges 46 is, however, preferred since it provides for a two-point engagement with the ball and has been found to provide a greater rotating force on the ball than any other known arrangement. This is of particular advantage after the cartridge 12 has been idle for a relatively long time such that the ink around the ball has dried, causing it to become sticky in its socket. It is at this time, during the initial operation of the cartridge 12 after a relatively long idle period, that the preferred arrangement is of particular advantage.

The marking device 10' illustrated in Fig. 2 is identical with the marking device 10 shown in Fig. 1, except that the base 32' is provided with a roller support 60 so that the weight of the marking device 10' may be directly transmitted to the surface 42 to be marked rather than being borne by the supporting member 34. This is of especial advantage where the supporting member 34 is of an extended cantilever form, as required in certain apparatus, and permits in such instances the supporting member 34 to be made of relatively lightweight material, since the roller support 60 relieves the member 34 of the weight of the marking device.

The marking devices 10 and 10' are particularly well adapted for use in the orthographic projection machine disclosed and claimed in my hereinabove identified copending application, wherein the marking devices 10 and 10' are illustrated as remotely controlled devices for making a series of dots upon the surface 42 to be marked, and wherein it is important that a freshly ink-coated surface of the ball be presented to the surface 42 to be marked each time the cartridge 12 is contacted to the surface. The marking devices 10 and 10' will also be of advantage in other types of apparatus such as, for example, check and bond signing machines since the practice of the invention substantially eliminates the problem of skipping at the beginning of a stroke and insures that the initial portion of each stroke will be inked as fully as subsequent portions thereof.

What is claimed is:

1. A marking device for making a mark on a selected surface comprising a ball point writing instrument including means for supplying ink to the ball point, a base member separate from said ballpoint writing instrument defining a wall surface, means for holding the point of said instrument adjacent to said wall surface and spaced apart from the selected surface, means for moving the ball point of said instrument into contact with the selected surface, and means for urging said ball point against said wall surface to roll the ball during its travel toward the selected surface.

2. A marking device for making a mark on a selected surface comprising a ball point writing instrument including means for supplying ink to the ball point, a base member separate from said ballpoint writing instrument defining a wall surface, means for holding the point of said instrument adjacent to said wall surface and spaced apart from the selected surface, means for moving the ball point of said instrument into contact with the selected surface, and means for urging said ball point against said wall surface during its travel toward the selected surface, said wall surface being configured for frictionally engaging the ball point as the ball point travels upon it thereby to cause the ball point to rotate.

3. A marking device for making a mark on a selected surface comprising a ball point writing instrument, a base member defining a wall surface, means for holding said instrument adjacent to said wall surface and spaced apart from the selected surface, means for moving the ball point of said instrument into contact with the selected surface, means for urging said ball point against said wall surface during its travel toward the selected surface, and a pair of ridges formed on said wall surface adjacent to each other and converging in the direction of travel of said ball point as it moves toward the selected surface, whereby when said ball point travels between said ridges toward the selected surface it is wedgingly engaged by said ridges and rotated thereby.

4. A marking device for making a mark on a selected surface comprising a ball point writing instrument including means for supplying ink to the ball point, means for supporting the point of said instrument adjacent to and spaced from the surface, a base member separate from said ballpoint writing instrument positioned adjacent to the ball point of said instrument, and means for controllably moving said instrument so that its ball point first rolls along said base member and then contacts the selected surface.

5. A marking device for making a mark on a selected surface comprising a ball point writing instrument including means for supplying ink to the ball point, means for supporting the point of said instrument adjacent to and spaced from the surface to be marked and at an angle thereto, a base member separate from said ball point writing instrument fixed with respect to said supporting means and positioned adjacent to the ball point of said instrument, said member having a contact surface disposed at an obtuse angle to the selected surface and configured to cause the ball of said ball point to rotate when said ball point is moved toward said contact surface, and actuating means for moving said ball point first along said contact surface and then into contact with the selected surface to be marked.

6. A marking device for making a mark on a selected surface comprising a ball point writing instrument, means for normally supporting said instrument in a position adjacent to and spaced from the surface and at an angle thereto, a base member fixed with respect to said supporting means and defining a bore having a tapered portion therein, said member being positioned so that said instrument lies partly within said bore and is guided thereby when it travels toward the surface, means for urging said instrument out of alignment with the axis of said bore, and means for controllably driving said instrument from the position in which it is normally supported into contact with the surface, said urging means being then effective to urge the ball point against the wall of said tapered bore portion as it travels toward the surface.

7. A marking device for making a mark on a selected surface comprising a ball point writing instrument, means for normally supporting said instrument in a position adjacent to and spaced from the surface and at an angle thereto, a base member fixed with respect to said supporting means and defining a bore having a tapered portion therein, said member being positioned so that said instrument lies partly within said bore and is guided thereby when it travels toward the surface, means for urging said instrument out of alignment with the axis of said bore, and means for controllably driving said instrument from the position in which it is normally supported into contact with the surface, said urging means being then effective to urge the ball point against the wall of said tapered bore portion as it travels toward the surface, said tapered bore portion being roughened to enhance the frictional engagement of the ball thereagainst.

8. A marking device for making a mark on a selected surface comprising a ball point writing instrument, means for normally supporting said instrument in a position adjacent to and spaced from the surface and at an angle thereto, a base member fixed with respect to said supporting means and defining a bore having a tapered portion therein, said member being positioned so that said instrument lies partly within said bore and is guided thereby when it travels toward the surface, means for urging said instrument out of alignment with the axis of said bore, means for controllably driving said instrument from the position in which it is normally supported into contact with the surface, said urging means being then effective to urge the ball point against the wall of said tapered bore portion as it travels toward the surface, and a plurality of radially extending ridges defining grooves of tapering width therebetween disposed on the surface of said tapered bore portion for wedgingly engaging the ball of the ball point as it travels along said tapered bore portion wall and thereby causing the ball to rotate.

9. A marking device for making a mark on a selected surface comprising a ball point writing instrument, means for normally supporting said instrument in a position adjacent to and spaced from the surface and at an angle thereto, a base member fixed with respect to said supporting means and defining a bore having a tapered portion therein, said member being positioned so that said instrument lies partly within said bore and is guided thereby when it travels toward the surface, means for urging said instrument out of alignment with the axis of said bore, means for controllably driving said instrument from the position in which it is normally supported into contact with the surface, said urging means being then effective to urge the ball point against the wall of said tapered bore portion as it travels toward the surface, and a plurality of concentrically arranged annular grooves formed in the wall surface of said tapered bore portion for causing the ball to rotate as it travels over the wall surface.

10. A marking device for making a mark on a selected surface comprising a ball point writing instrument, means for normally supporting said instrument in a position adjacent to and spaced from the surface and at an angle thereto, a base member fixed with respect to said supporting means and defining a bore having a tapered portion therein, said member being positioned so that said instrument lies partly within said bore and is guided thereby when it travels toward the surface, means for urging said instrument out of alignment with the axis of said bore, means for controllably driving said instrument from the position in which it is normally supported into contact with the surface, said urging means being then effective to urge the ball point against the wall of said tapered bore portion as it travels toward the surface, and a plurality of concentric spiral grooves formed in the wall surface of said tapered bore portion for causing the ball to rotate as it travels over the wall surface.

11. A marking device for making a mark upon a selected horizontal surface comprising a vertical support, a solenoid coil mounted at the upper end of said support, a magnetic plunger having a rounded portion fitted within said coil, said plunger being vertically movable responsive to energization of said coil and being tiltable with respect to said coil, a ball point writing instrument carried by said plunger at the lower end thereof and having a downwardly facing ball point, a base member fixed to said support at the bottom thereof and defining a generally vertical guideway, the ball point of said instrument normally lying within said guideway when said instrument is carried by said solenoid and plunger to the upper limit of its travel, said guideway including a sloping wall portion, a weight eccentrically mounted on said plunger and effective to urge said instrument downwardly and also out of alignment with said guideway, said weight being effective responsive to de-energization of said solenoid to drive said instrument downwardly along said sloping wall portion and then into contact with said selected surface.

12. A marking device for making a mark upon a selected horizontal surface comprising a vertical support, a solenoid coil mounted at the upper end of said support, a magnetic plunger having a rounded portion fitted within said coil, said plunger being vertically movable responsive to energization of said coil and being tiltable with respect to said coil, a ball point writing instrument carried by said plunger at the lower end thereof and having a downwardly facing ball point, a base member fixed to said support at the bottom thereof and defining a generally vertical guideway, the ball point of said instrument normally lying within said guideway when said instrument is carried by said solenoid and plunger to the upper limit of its travel, said guideway including a sloping wall portion, a plurality of downwardly converging ridges disposed on said sloping wall portion for pinchingly engaging the ball of said writing instrument as it travels downwardly along said sloping wall portion and thereby causing the ball to rotate, a weight eccentrically mounted on said plunger and effective to urge said instrument downwardly and also out of alignment with said guideway, said weight being effective responsive to de-energization of said solenoid to drive said instrument downwardly along said sloping wall portion and then into contact with said selected surface.

References Cited in the file of this patent
UNITED STATES PATENTS
2,843,670     Hell et al.             July 15, 1958
FOREIGN PATENTS
590,512     Germany              Jan. 9, 1934